US012309554B2

(12) United States Patent
Xu et al.

(10) Patent No.: US 12,309,554 B2
(45) Date of Patent: May 20, 2025

(54) AUTOMATIC SELECTION OF HEARING INSTRUMENT COMPONENT SIZE

(71) Applicant: Starkey Laboratories, Inc., Eden Prairie, MN (US)

(72) Inventors: Jingjing Xu, Eden Prairie, MN (US); Justin Burwinkel, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 420 days.

(21) Appl. No.: 17/663,607

(22) Filed: May 16, 2022

(65) Prior Publication Data

US 2022/0279294 A1 Sep. 1, 2022

Related U.S. Application Data

(63) Continuation of application No. PCT/US2020/060765, filed on Nov. 16, 2020.

(60) Provisional application No. 62/937,566, filed on Nov. 19, 2019.

(51) Int. Cl.
*H04R 25/00* (2006.01)

(52) U.S. Cl.
CPC ... *H04R 25/658* (2013.01); *H04R 2225/0216* (2019.05); *H04R 2225/77* (2013.01)

(58) Field of Classification Search
CPC .......... H04R 25/658; H04R 2225/0216; H04R 2225/77; H04R 25/60; H04R 2225/021; H04R 25/70; H04R 1/1041; A61B 5/121
See application file for complete search history.

(56) References Cited

U.S. PATENT DOCUMENTS

| | | | | |
|---|---|---|---|---|
| 8,900,128 B2 | 12/2014 | Berglund et al. | | |
| 9,706,282 B2 | 7/2017 | Burgett et al. | | |
| 10,405,081 B2 * | 9/2019 | Hviid | H04R 1/1083 | |
| 2001/0033664 A1 * | 10/2001 | Poux | H04R 25/70 | 381/60 |
| 2001/0040973 A1 * | 11/2001 | Fritz | A61B 5/6817 | 381/328 |
| 2004/0218788 A1 * | 11/2004 | Geng | G06V 40/10 | 382/118 |
| 2006/0204013 A1 * | 9/2006 | Hannibal | H04R 25/70 | 381/60 |

(Continued)

FOREIGN PATENT DOCUMENTS

| | | |
|---|---|---|
| DE | 102017128117 A1 | 5/2019 |
| EP | 0158391 A1 | 10/1985 |

(Continued)

OTHER PUBLICATIONS

Communication pursuant to Article 94(3) EPC from counterpart European Application No. 20821536.8 dated Feb. 12, 2024, 5 pp.

(Continued)

*Primary Examiner* — Alicia M. Choi
(74) *Attorney, Agent, or Firm* — Shumaker & Sieffert, P.A.

(57) ABSTRACT

An example method includes capturing, via one or more sensors of a computing system, a representation of an ear of a user; determining, based on the representation, a value of a measurement of the ear of the user; and selecting, based on the value of the measurement, a length of a wire or tube of a hearing instrument to be worn on the ear of the user.

18 Claims, 5 Drawing Sheets

(56) References Cited

U.S. PATENT DOCUMENTS

| | | | | |
|---|---|---|---|---|
| 2008/0008343 | A1* | 1/2008 | Husung | H04R 25/70 381/322 |
| 2014/0105438 | A1* | 4/2014 | Fretz | H04R 25/02 381/328 |
| 2014/0335280 | A1* | 11/2014 | Musser | C09D 5/30 427/430.1 |
| 2015/0264496 | A1* | 9/2015 | Reber | H04R 25/652 381/328 |
| 2020/0128342 | A1* | 4/2020 | Hoorzad | H04R 31/00 |
| 2021/0089773 | A1* | 3/2021 | Yang | H04R 25/70 |
| 2021/0385588 | A1* | 12/2021 | Feilner | H04R 25/70 |

FOREIGN PATENT DOCUMENTS

| | | | |
|---|---|---|---|
| EP | 2834750 | B1 | 2/2015 |
| GB | 2569817 | A | 7/2019 |
| WO | 2011022409 | A1 | 8/2010 |
| WO | 2013149645 | A1 | 10/2013 |
| WO | 20200074061 | A1 | 4/2020 |

OTHER PUBLICATIONS

Response to Communication pursuant to Article 94(3) EPC dated Feb. 12, 2024, from counterpart European Application No. 20821536.8 filed Jun. 5, 2024, 44 pp.

CNBC, “Apple Showcases Measure App”, YouTube, Retrieved from: https://www.youtube.com/watch?v=XPv6_pxrvzw. Jun. 8, 2018, 3 pp.

Hertsens, “CES 2018: Snugs Custom Ear Tip Measurement App”, InnerFidelity, Jan. 15, 2018, 5 pp.

International Preliminary Report on Patentability from International Application No. PCT/US2020/060765, dated Jun. 2, 2022, 9 pp.

International Search Report and Written Opinion of International Application No. PCT/US2020/060765, dated Feb. 4, 2021, 15 pp.

* cited by examiner

AUTOMATIC SELECTION OF HEARING INSTRUMENT COMPONENT SIZE

This application is a continuation of International Application No. PCT/US2020/060765, filed on Nov. 16, 2020, which claims the benefit of U.S. Provisional Patent Application 62/937,566, filed Nov. 19, 2019, the entire content of both of which are incorporated by reference herein.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on.

SUMMARY

This disclosure describes techniques for using a computing device to automatically select at least a size of a component of a hearing instrument to be worn on an ear of a user based on scans of the ear of the intended user. For instance, a user may hold an object having known dimensions (e.g., size) near their ear while one or more sensors of a mobile computing device may capture an image of the user's ear (e.g., a representation of the user's ear) with the object. Based on the dimensions of the object, the computing device may determine a value of a measurement of the user's ear (e.g., a distance between a top of the ear (e.g., a superior auricular root, or helix root, etc.) and a top of a canal of the ear). The computing device may select a size of a component of a hearing instrument to be worn on the ear (e.g., a wire or tube length) based on the determined value of the measurement.

In some examples, in addition to or in place of using the object having known dimensions, the mobile computing device may capture the representation to include more than just dimensionless image data. For instance, the mobile computing device may capture the representation using one or more dimension capturing sensors (e.g., depth sensors, one or more structured light sensors, and/or one or more time of flight sensors). Using the representation captured by the dimension capturing sensors, the mobile computing device may determine the value of the measurement of the user's ear even were the object having known dimensions is not present.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
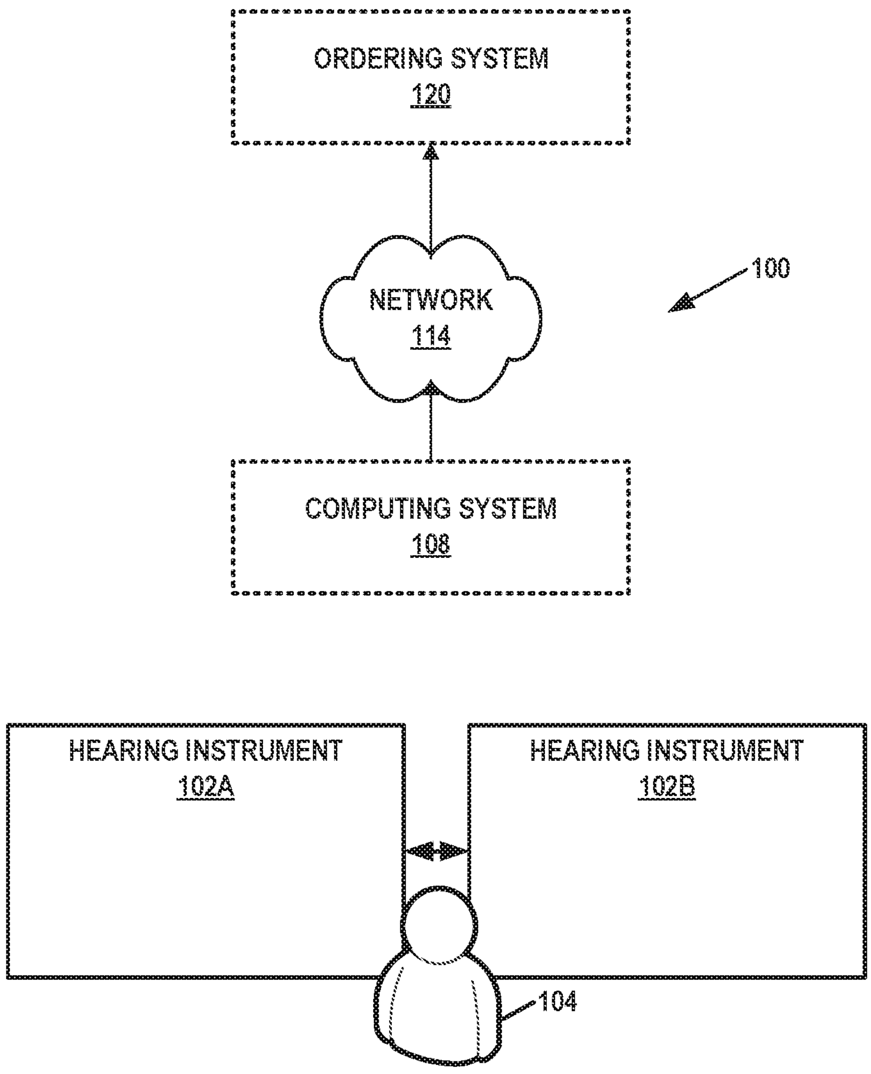
FIG. 1 is a conceptual diagram illustrating an example system that includes one or more hearing instrument(s), in accordance with one or more techniques of this disclosure.

FIG. 1 is a conceptual diagram illustrating an example system 100 that includes computing system 108 configured to automatically select at least a size of a component of a hearing instrument to be worn on an ear of a user, in accordance with one or more techniques of this disclosure. As shown in FIG. 1, system 100 may include hearing instruments 102A and 102B (collectively "hearing instruments 102"), computing system 108, and ordering system 120.

Hearing instruments 102 may comprise one or more of various types of devices that are configured to provide auditory stimuli to a user and that are designed for wear and/or implantation at, on, or near an ear of the user. Hearing instruments 102 may be worn, at least partially, in the ear canal or concha. One or more of hearing instruments 102 may include behind the ear (BTE) components that are worn behind the ears of user 104. In some examples, one or more of hearing instruments 102 is able to provide auditory stimuli to user 104 via a bone conduction pathway.

In any of the examples of this disclosure, each of hearing instruments 102 may comprise a hearing instrument. Hearing instruments include devices that help a user hear sounds in the user's environment. Example types of hearing instruments may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter (OTC), direct-to-consumer (DTC), or prescription devices. Furthermore, in some examples, hearing instruments 102 include devices that provide auditory stimuli to the user that correspond to artificial sounds or sounds that are not naturally in the user's environment, such as recorded music, computer-generated sounds, or other types of sounds. For instance, hearing instruments 102 may include so-called "hearables," earbuds, earphones, or other types of devices. Some types of hearing instruments provide auditory stimuli to the user corresponding to sounds from the user's environmental and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear contains all of the electronic components of the hearing instrument, including the receiver (i.e., the speaker). The receiver conducts sound to the inside of the ear via an audio tube. In some examples, one or more of hearing instruments 102 may be receiver-in-canal (RIC) hearing-instrument, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

While shown as two separate instruments, in some instances, such as when user 104 has unilateral hearing loss, user 104 may wear a single hearing instrument. In other instances, such as when user 104 has bilateral hearing loss, the user may wear two hearing instruments, with one hearing instrument for each ear of the user.

Hearing instruments 102 may include one or more components that are available (e.g., from a manufacturer of hearing instruments 102) in a variety of sizes and/or colors. As one example, as discussed above, a BTE hearing instrument of hearing instruments 102 may include an audio tube that conducts sound from a receiver located in a housing worn behind the ear to the inside of the ear. The audio tube may be available in a variety of lengths (e.g., to provide enough length to reach from the receiver to the inside of the ear, without too much slack) and/or a variety of colors (e.g., to match a wearer's skin tone). As another example, a RIC hearing instrument of hearing instruments 102 may include a wire that carries electrical signals from a housing worn behind the ear to a housing worn in the ear canal that contains a receiver. The wire may be available in a variety of lengths (e.g., to provide enough length to reach from the behind the ear housing to the in-ear housing, without too much slack) and/or a variety of colors (e.g., to match a wearer's skin tone).

Recent rulemaking from the U.S. Food and Drug Administration (FDA) will begin a new era of providing over-the-counter (OTC) and direct-to-consumer (DTC) hearing aids to hearing-impaired individuals. This presents a challenge of how to ensure users are able to appropriately select sizing of hearing instrument components without specialized equipment and a professional. Without professional guidance, users may select incorrectly sized and/or colored hearing instrument components, which may result in poor performance of the hearing instrument that may leave users frustrated and unsatisfied.

In accordance with one or more techniques of this disclosure, computing system 108 may automatically select at least a size of a component of one or both of hearing instruments 102 based on scans of one or both ears of user 104. For instance, user 104 may hold an object having known dimensions (e.g., size) near their ear while one or more sensors of computing system 108 may capture an image of user 104's ear with the object. Based on the dimensions of the object, computing system 108 may determine a value of a measurement of user 104's ear (e.g., a distance between a top of the ear and a top of a canal of the ear). Computing system 108 may select a size of a component of one or both of hearing instruments 102 to be worn on the ear (e.g., a wire length of a RIC hearing instrument or a tube length of a BTE hearing instrument) based on the determined value of the measurement. In this way, computing system 108 may improve the accuracy of component size (e.g., wire or tube length) selection without requiring professional guidance.

Figure 2:
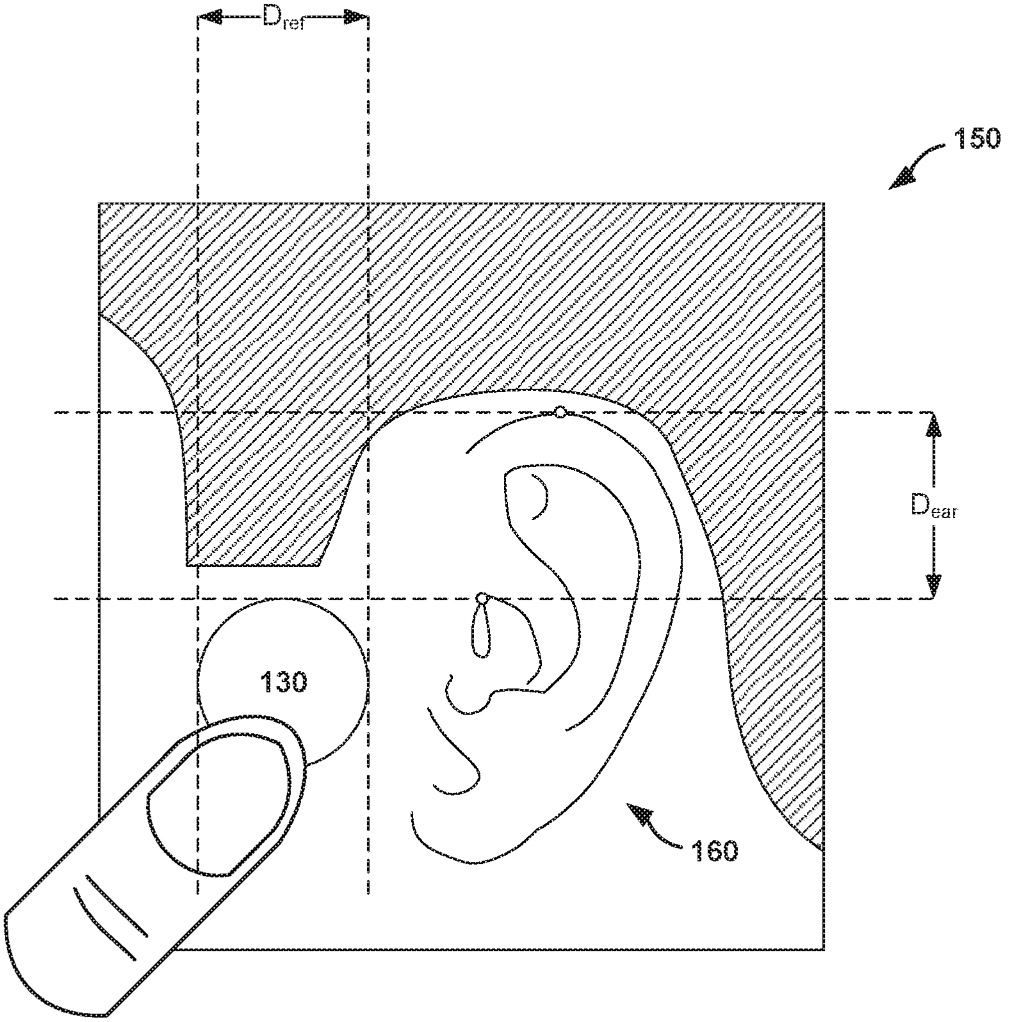
FIG. 2 is a conceptual diagram illustrating an image of an ear of a user captured by a computing system, in accordance with one or more techniques of this disclosure.

FIG. 2 is a conceptual diagram illustrating an image 150 of an ear of a user captured by a computing system, in accordance with one or more techniques of this disclosure. As shown in FIG. 2, image 150 depicts ear 160 and object 130. Ear 160 may be considered to be an ear of user 104 of FIG. 1.

Referring to both FIGS. 1 and 2, a camera of computing system 108 may capture image 150 (e.g., a representation of an ear of user 104) while user 104 holds object 130 near ear 160. In the example of FIG. 2, object 130 may be a coin (e.g., a quarter) however any object having known dimensions may be used.

In some examples, the camera (or multiple cameras included in computing system 108, such as a smartphone that includes multiple cameras having different properties, such as focal lengths) may bracket one or more of the ISO, shutter speed, or aperture to provide at least two images of different capture characteristics (e.g., two images of different light exposure). In some examples, computing system 108 may utilize High Dynamic Range (HDR) images to make measurements relative to aspects of the subject's ear canal and external ear (pinna) geometries, beyond the opening/aperture of the ear canal. In some examples, computing system 108 may purposefully use a wide aperture which allows for a narrow depth of field. By bracketing focal points and/or focal distances, the system could judge depth of specific ear features based upon the sharpness of elements of the image at those various different focal depths.

Computing system 108 may process image 150 to determine relative dimensions of object 130. For instance, computing system 108 may determine that a relative dimension object 130 (e.g., $D_{ref}$) is 375 pixels. Computing system 108 may obtain the dimensions of object 130 and determine an image dimension scale based on the known dimensions of object 130 and the determined relative dimensions of object 130. For instance, computing system 108 may obtain (e.g., from a memory device) the diameter of object 130 as 1.25 inches. Computing system 108 may determine the image dimension scale by dividing $D_{ref}$ by the obtained known diameter of object 130 to determine that the image is 300 pixels per inch (e.g., 375 pixels/1.25 inches).

Computing system 108 may determine a value of a measurement of the ear of the user. For instance, computing system 108 may further process image 150 to determine relative dimensions of a measurement of ear 160 (e.g., determine a value of a measurement of an ear of the user). Computing system 108 may calculate a distance between a top of ear 160 and a top of a canal of ear 160 (e.g., $D_{ear}$) as 360 pixels. Computing system 108 may scale the relative dimensions of the measurement of ear 160 by the determined image dimension scale to determine an absolute value of the measurement. For instance, computing system 108 may divide $D_{ear}$ by the determined image dimension scale to determine that the absolute value of the distance between the top of ear 160 and the top of the canal of ear 160 is 1.2 inches (e.g., 360 pixels/300 pixels per inch).

Computing system 108 may select a size of a component of a hearing instrument based on the determined value of the measurement. For instance, computing system 108 may obtain (e.g., from a memory device) a look-up table of available lengths of a component (e.g., a wire or a tube) mapped to values of the measurement. The look up table may specify five different lengths with corresponding ranges of values of the measurement. Computing system 108 may select the component length based on the look-up table and the determined value of the measurement. As one example, computing system 108 may determine in which range of values in the look-up table the determined value of the measurement for ear 160 resides and select the component length corresponding to the determined range.

Computing system 108 may output an indication of the selected size of the component. As one example, computing system 108 may display a graphical user interface indicating the selected size to user 104. As another example, computing system 108 may output a message (e.g., via network 114, which may be the Internet) including the indication of the selected size to a remote server device, such as ordering system 120 of FIG. 1.

Ordering system 120 may receive the message indicating the selected size and perform one or more actions to facilitate an order of hearing instruments 104. For instance, ordering system 120 may facilitate an order of hearing instruments 104 with component having the selected size.

Figure 3:
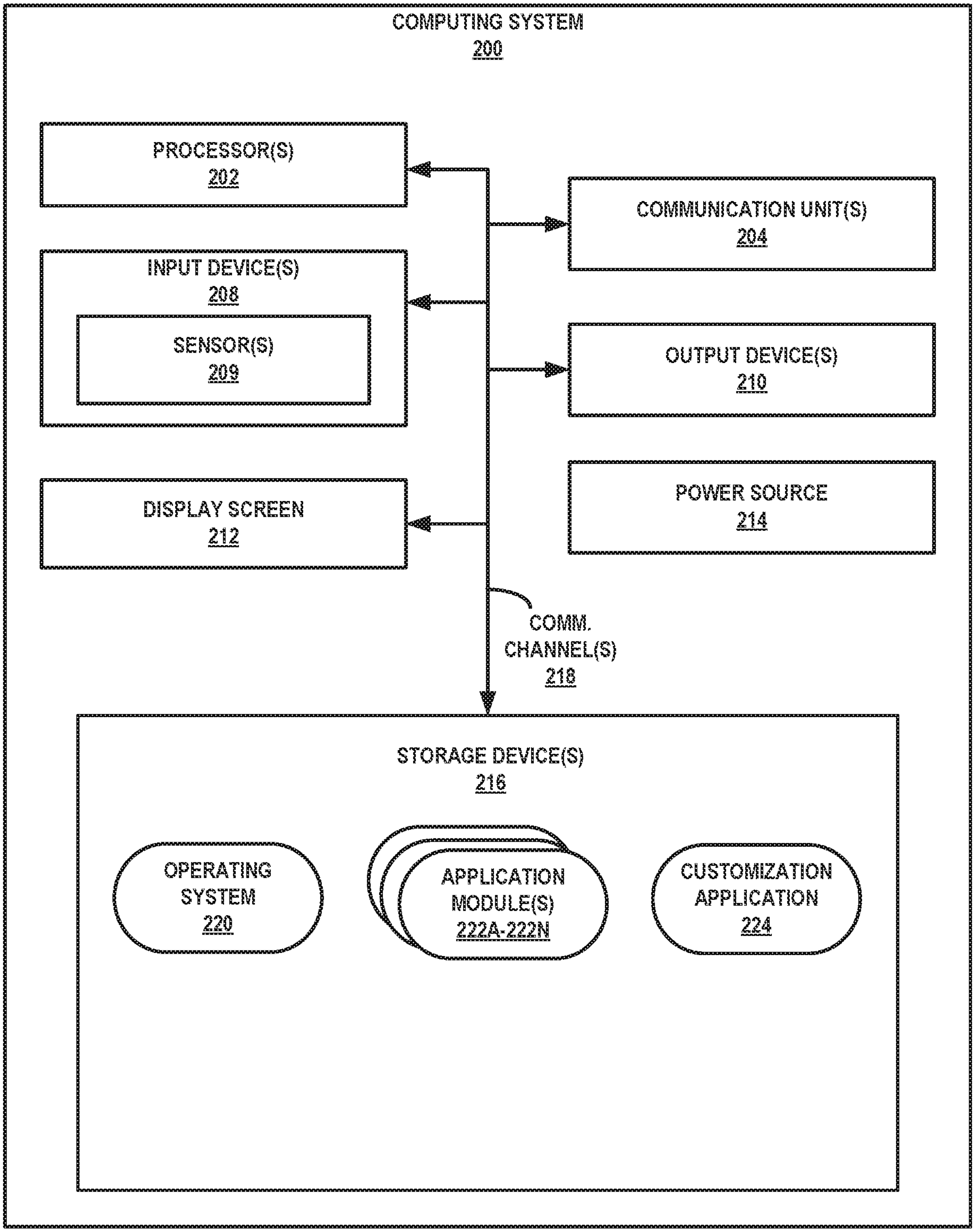
FIG. 3 is a block diagram illustrating example components of a computing system, in accordance with one or more aspects of this disclosure

FIG. 3 is a block diagram illustrating example components of computing system 200, in accordance with one or more aspects of this disclosure. FIG. 3 illustrates only one particular example of computing system 200, and many other example configurations of computing system 200 exist. Computing system 200 may be any computing system capable of performing the operations described herein. Examples of computing system 200 include, but are not limited to laptop computers, cameras, desktop computers, kiosks, smartphones, tablets, servers, and the like.

As shown in the example of FIG. 3, computing system 200 includes one or more processor(s) 202, one or more communication unit(s) 204, one or more input device(s) 208, one or more output device(s) 210, a display screen 212, a power source 214, one or more storage device(s) 216, and one or more communication channels 218. Computing system 200 may include other components. For example, computing system 200 may include physical buttons, microphones, speakers, communication ports, and so on. Communication channel(s) 218 may interconnect each of components 202, 204, 208, 210, 212, and 216 for inter-component communications (physically, communicatively, and/or operatively). In some examples, communication channel(s) 218 may include a system bus, a network connection, an inter-process communication data structure, or any other method for communicating data. Power source 214 may provide electrical energy to components 202, 204, 208, 210, 212 and 216.

Storage device(s) 216 may store information required for use during operation of computing system 200. In some examples, storage device(s) 216 have the primary purpose of being a short term and not a long-term computer-readable storage medium. Storage device(s) 216 may be volatile memory and may therefore not retain stored contents if powered off. Storage device(s) 216 may further be configured for long-term storage of information as non-volatile memory space and retain information after power on/off cycles. In some examples, processor(s) 202 on computing system 200 read and may execute instructions stored by storage device(s) 216.

Computing system 200 may include one or more input device(s) 208 that computing device 200 uses to receive user input. Examples of user input include tactile, audio, video user input, and gesture or motion (e.g., a user may shake or move computing system 200 in a specific pattern). Input device(s) 208 may include presence-sensitive screens, touch-sensitive screens, mice, keyboards, voice responsive systems, microphones or other types of devices for detecting input from a human or machine.

As shown in FIG. 3, input devices 208 may include one or more sensors 209, which may be configured to sense various parameters. For instance, sensors 209 may be capable of capturing a representation of an ear of a user. Examples of sensors 209 include, but are not limited, to cameras (e.g., RGB cameras), depth sensors, structured light sensors, and time of flight sensors.

Communication unit(s) 204 may enable computing system 200 to send data to and receive data from one or more other computing devices (e.g., via a communications network, such as a local area network or the Internet). For instance, communication unit(s) 204 may be configured to receive source data exported by hearing instrument(s) 102, receive comment data generated by user 104 of hearing instrument(s) 102, receive and send request data, receive and send messages, and so on. In some examples, communication unit(s) 204 may include wireless transmitters and receivers that enable computing system 200 to communicate wirelessly with the other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, LTE, 5G, and WI-FI™ radios, Universal Serial Bus (USB) interfaces, etc. Computing system 200 may use communication unit(s) 204 to communicate with one or more hearing instruments (e.g., hearing instrument 102 (FIG. 1)). Additionally, computing system 200 may use communication unit(s) 204 to communicate with one or more other remote devices (e.g., ordering system 129 (FIG. 1)). In some examples, computing system 200 may communicate with the ordering system via hearing aid fitting software (e.g., published by a manufacturer of hearing instruments 102). As such, it is possible for computing system 200 to include a hearing instrument programming device that is configured to transfer the size information to the ordering system. Examples of technologies that could be used by hearing instruments (and thus their programming device) could include NFMI, other forms of magnetic induction (telecoil, GMR, TMR), 900 MHz, 2.4 GHz, etc.

Output device(s) 210 may generate output. Examples of output include tactile, audio, and video output. Output device(s) 210 may include presence-sensitive screens, sound cards, video graphics adapter cards, speakers, liquid crystal displays (LCD), or other types of devices for generating output.

Processor(s) 202 may read instructions from storage device(s) 216 and may execute instructions stored by storage device(s) 216. Execution of the instructions by processor(s) 202 may configure or cause computing system 200 to provide at least some of the functionality ascribed in this disclosure to computing system 200. As shown in the example of FIG. 3, storage device(s) 216 include computer-readable instructions associated with operating system 220, application modules 222A-222N (collectively, "application modules 222"), and a customization application 224.

Execution of instructions associated with operating system 220 may cause computing system 200 to perform various functions to manage hardware resources of computing system 200 and to provide various common services for other computer programs. Execution of instructions associated with application modules 222 may cause computing device 200 to provide one or more of various applications (e.g., "apps," operating system applications, etc.). Application modules 222 may provide particular applications, such as text messaging (e.g., SMS) applications, instant messaging applications, email applications, social media applications, text composition applications, and so on.

Execution of instructions associated with customization application 224 by processor(s) 202 may cause computing system 200 to perform one or more of various functions. For example, execution of instructions associated with customization application 224 may cause computing device 200 to perform one or more actions to automatically determine a size and/or a color of a component of a hearing instrument (e.g., a hearing assistance device) based on a representation of an ear of a user of the hearing instrument (e.g., as captured by sensors 209).

In operation, a user may hold computing system 200 and/or position themselves such that an ear of the user is in a field of view of sensors 209. Customization application 224 may be executed by processors 202 to cause sensors 209 to capture a representation of the ear of the user, and determine, based on the representation, a value of a measurement of the ear of the user.

In some examples, customization application 224 may utilize augmented reality (AR) technology, or another graphical processing technology, to assist in capturing the representation of the ear. As one example, computing system 200 may output various guides to assist the user in facilitating the capture of the representation. For instance, customization application 224 may output, for display at a display device connected to the computing system (e.g., display screen 212), live image data captured by an image sensor of sensors 209 (e.g., display a live-feed of the image sensor on display screen 212). By causing the display of the live image data, the user of computing system 200 may be able to better position their ear in a field of view of sensors 209, which may result in the capture of a higher quality representation of the ear.

Figure 4:
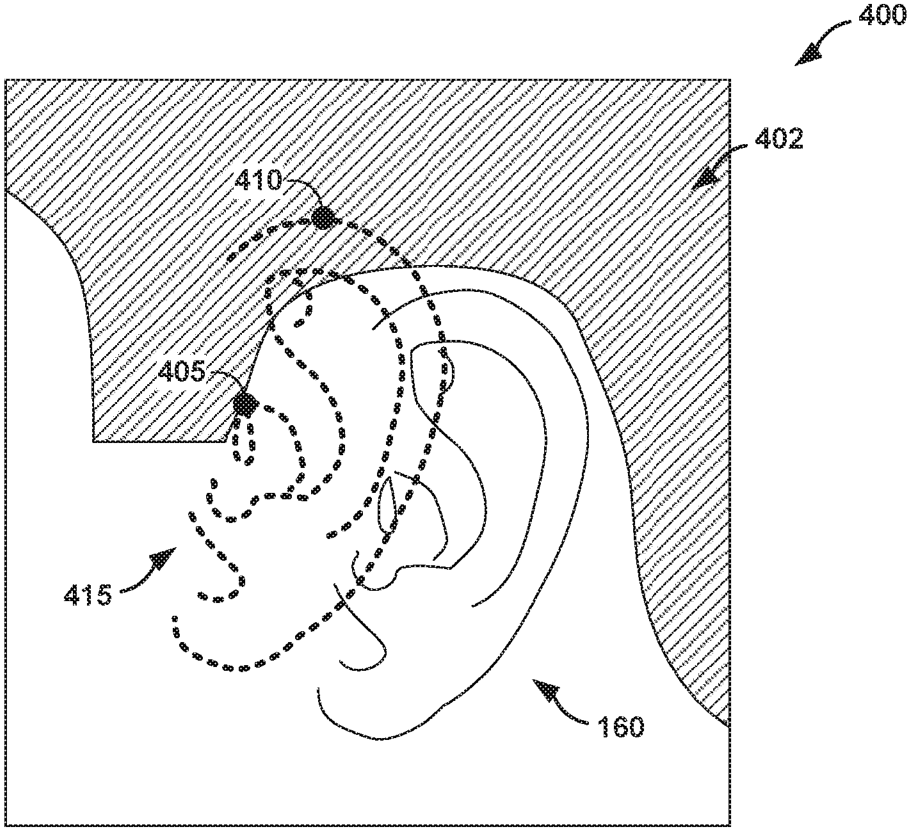
FIG. 4 is a conceptual diagram illustrating a graphical user interface that may be displayed by a computing system to facilitate the capture of a representation of an ear of a user, in accordance with one or more techniques of this disclosure.

In some examples, customization application 224 may output, for display at the display device (e.g., display screen 212), one or more graphical guides configured to assist the user in facilitating the capture of the representation of the ear of the user. The graphical guides may include anatomy markers and/or a graphic of an ear (e.g., as shown in FIG. 4). In some examples, customization application 224 may output the graphical guides for display on the live image data (e.g., as a layer overlaid upon the live image data). Customization application 224 may cause sensors 209 to capture, while the live image data and the graphical guides are being displayed by the display device, the representation of the ear of the user (e.g., via at least the image sensor).

FIG. 4 is a conceptual diagram illustrating a graphical user interface that may be displayed by a computing system to facilitate the capture of a representation of an ear of a user, in accordance with one or more techniques of this disclosure. Graphical user interface (GUI) 400 may be displayed by a display device of a computing system, such as display screen 212 of computing system 200 of FIG. 2. As shown in FIG. 4, GUI 400 includes live image data 402 (including ear 160), graphical guides 405, 410, and 415. As discussed above, graphical guides may include anatomy markers and/or a graphical representation of an ear. In general, an anatomy marker may be any marker that is displayed to correspond to a particular piece of anatomy. Graphical guides 405 and 410 are examples of anatomy markers. In particular, graphical guide 405 is a top of canal (e.g., top of ear canal, superior portion of the canal aperture) marker and graphical guide 410 is a top of ear marker. Graphical guide 415 is an example graphic of an ear. Graphical guides 405/410/415 are merely examples and other graphical guides may be used in other examples. For instance, a graphical representation of a hearing instrument of a component thereof (e.g., the same model being customized) may be displayed to facilitate the capture.

While one or more of graphical guides 405/410/415 are displayed, a user of computing system 200 may align their ear, or features of their ear, with corresponding guides. For instance, the user may move themselves or move computing system 200 so as to align graphical guide 405 with the top of their ear canal and align graphical guide 410 with the top of their ear. Once such alignment is achieved, computing system 200 may capture the representation of ear 160 and determine the size and/or color of the component as described herein.

In some examples, computing system 200 may perform one or more actions to make it easier for a user to capture a representation of their own ear. As one example, computing system 200 may mirror at least a portion of what is displayed at display screen 212 (e.g., GUI 400) on a display of another device. As another example, computing system 200 may cause a display of another device to display written and/or symbolic instruction to enable a user to align anatomy of their ear with graphical guides. As another example, computing system 200 may output audible instructions to enable a user to align anatomy of their ear with graphical guides. As another example, computing system 200 may output haptic feedback to enable a user to align anatomy of their ear with graphical guides.

While discussed above as being performed by the user, it is noted that the techniques of this disclosure may allow for another person to operate computing system 200 to capture the representation of the ear of the user. For instance, where computing system 200 includes a smartphone, the user may provide the smartphone to another person who may operate the smartphone to capture the representation of the ear of the user.

Returning to FIG. 3, in some examples, the representation of the ear may be in the form of dimensionless image data. For instance, an image sensor (e.g., a camera) of sensors 209 may capture a dimensionless image of the user's ear. In some examples, such as where the representation of the ear is dimensionless, customization application 224 may determine the value of the measurement based on dimensions of an object of known dimensions in the image (e.g., object 130 of FIG. 2). In some examples, customization application 224 may estimate dimensions of the image using data measured by sensors other than the image sensor of sensors 209. For instance, customization application 224 may utilize inertial data captured by a motion sensor (e.g., inertial measurement unit (IMU), accelerometer, gyroscope, barometer, etc.) position data captured by a global positioning sensor (GPS), and/or directional data captured by a magnetometer of input devices 208. As one example, customization application 224 may combine the inertial data with multiple images captured by the image sensor to create a three-dimensional model of the user's ear.

In some examples, the representation of the ear of the user may include data in addition to or in place of the dimensionless image data. For instance, a structured light sensor (e.g., one or more cameras and one or more projectors) of sensors 209 may capture an image of the user's ear with a known pattern projected on the user's ear. Customization application 224 may determine the value of the measurement based on the known pattern relative to the user's ear.

Regardless of the way in which customization application 224 determines the value of the measurement, customization application 224 may select a size of a component of a hearing instrument based on the determined value of measurement. In some examples, customization application 224 may select the size from a pre-determined set of sizes. For instance, customization application 224 may obtain, from storage devices 216, a look-up table of available lengths of a component (e.g., a wire or a tube) mapped to values of the measurement. The look up table may specify five different lengths with corresponding ranges of values of the measurement. Customization application 224 may select the component length based on the look-up table and the determined value of the measurement. As one example, customization application 224 may identify a range of values in the look-up table in-which the determined value of the measurement resides and select the component length corresponding to the identified range.

Additionally or alternatively to customizing a size of a component of a hearing instrument, it may be desirable for a user to be able to customize a color of the component (or another different component). Currently, when a user with dark skin complexion desires a darker component (e.g., receiver wire/tube), the user may utilize dye to change a color (e.g., darken) the component. There is currently not a method for offering or producing customized color components for the user.

In accordance with one or more techniques of this disclosure, customization application 224 may be executable by processors 202 to select a color of the component of the hearing instrument. For instance, based on a representation of the ear of the user (which may be the same or different than the representation used to select the size), customization application 224 may determine a pigment of a skin of the user. Customization application 224 may select a color of the component based on the determined pigment. In some examples, customization application 224 may select the color from a pre-determined set of component colors. For instance, customization application 224 may obtain, from storage devices 216, a look-up table of available colors of a component (e.g., a wire or a tube) mapped to values of pigments. The look up table may specify five different colors with corresponding ranges of pigment. customization application 224 may select the component color based on the look-up table and the determined pigment of the user. As one example, customization application 224 may identify a range of values in the look-up table in-which the determined pigment resides and select the component color corresponding to the identified range. In this way, customization application 224 may enable users to obtain color-customized hearing instrument components that more accurately match their skin tone without having to utilize dyes at home.

Figure 5:
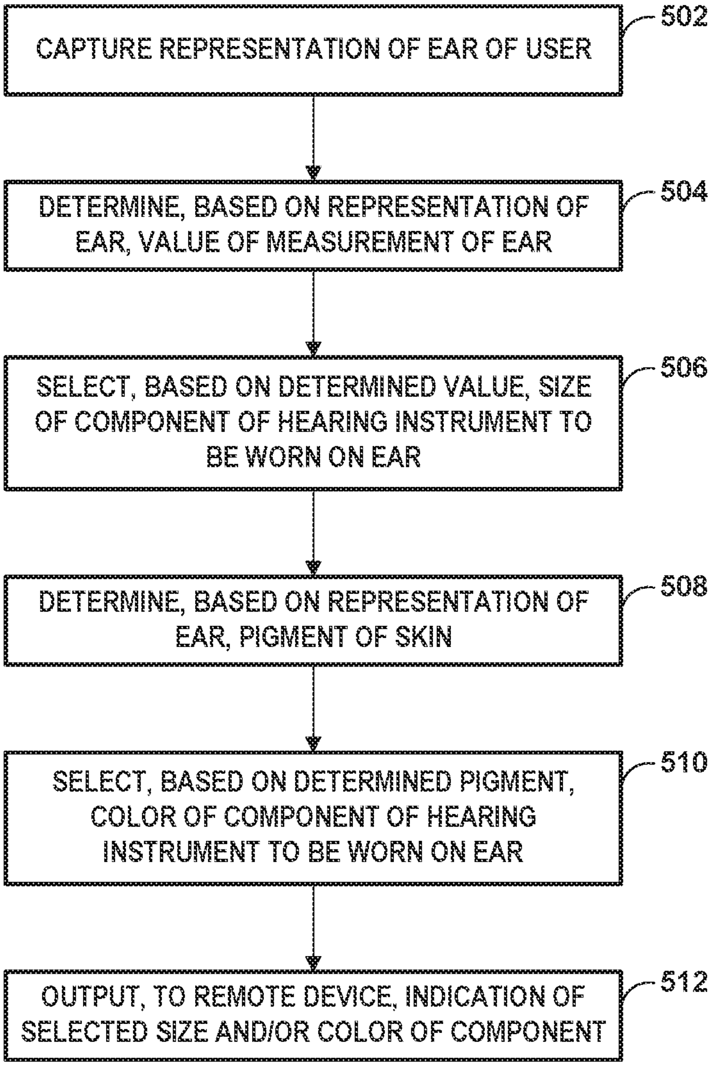
FIG. 5 is a flowchart illustrating an example operation of a processing system for customization of hearing instruments, in accordance with one or more aspects of this disclosure.

FIG. 5 is a flowchart illustrating an example operation of a processing system for customization of hearing instruments, in accordance with one or more aspects of this disclosure. The flowcharts of this disclosure are provided as examples. Other examples may include more, fewer, or different actions; or actions may be performed in different orders or in parallel. Although FIG. 5 and other parts of this disclosure are discussed as being performed with respect to hearing instruments 102, it is to be understood that much of this discussion is applicable in cases where user 104 only uses a single hearing instrument. In the example of FIG. 5, a computing system (e.g., computing system 108 of FIG. 1 or computing system 200 of FIG. 3) may perform actions (500) through (512) to customize hearing instruments 102.

Computing system 200 may capture a representation of an ear of a user (502). For instance, customization application 224 may cause one or more of sensors 209 of computing system 200 to capture a dimensioned or dimensionless representation of the ear of user 104 on which a hearing instrument of hearing instruments 102 is to be worn. As discussed above, in some examples, computing system 200 may output various guides to assist the user in facilitating the capture of the representation (e.g., as shown in FIG. 4).

Computing system 200 may determine, based on the representation, a value of a measurement of the ear of the user (504). For instance, customization application 224 may process the representation to determine a distance between a top of the ear and a top of a canal of the ear (e.g., $D_{ear}$ of FIG. 2).

Computing system 200 may select, based on the value of the measurement, a size of a component of a hearing instrument to be worn on the ear of the user (506). For instance, customization application 224 may select a size, from a pre-determined set of component sizes, of the component. As discussed above, in some examples, the size of the component may be a length of a wire or tube. Other examples could include: (a) depth from aperture of ear canal to the first bend of the ear canal, which may be visible to computing system 200 (e.g., in order to give a more customized depth of insertion and orientation of sound-port/speaker/receiver), (b) size of the concha bowl, which could be measured in lengths between various different anatomical markers of the ear (e.g., to provide a better fit of earmolds and in-the-ear devices), (c) distance between pinna and side of head (e.g., to allow computing system 200 to determine optimal width of a behind-the-ear or over-the-ear instrument, or to optimize the coupling of the aforementioned+ frames of eye glasses, etc.).

Computing system 200 may determine, based on the representation, a pigment of a skin of the user (508). For instance, where the representation of the ear includes a color (e.g., RGB, CMYK, etc.) image of the ear, customization application 224 may determine the pigment based in statistics related to color of samples of the image (e.g., an average or other such statistical calculation). In some examples, the image may include an object of known color (or colors), which customization application 224 may utilize to calibrate the pigment determination process. For instance, similar to object 130 of FIG. 2, a user may hold an object of known color near their ear while computing system 200 captures the representation of the ear. In some examples, the object may be the same as object 130 (e.g., object 130 may be of both known size and known color). In some examples, the image sensor/camera of computing system 200 may be calibrated or assigned a custom white balance value (either before or after capturing the representation).

Computing system 200 may select, based on the pigment, a color of the component of the hearing instrument to be worn on the ear of the user (510). For instance, customization application 224 may select a color, from a pre-determined set of component colors, of the component. As discussed above, in some examples, the color of the component may be a color of a wire or tube.

Computing system 200 may output, to a remote device, an indication of the selected size and/or an indication of the selected color of the component (512). For instance, customization application 224 may cause communication units 204 to output a message (e.g., via network 114, which may be the Internet) including the indication of the selected size and/or color to a remote server device, such as ordering system 120 of FIG. 1. As discussed above, ordering system 120 may receive the message indicating the selected size and perform one or more actions to facilitate an order of hearing instruments 104. For instance, ordering system 120 may facilitate an order of hearing instruments 104 with component having the selected size and/or the selected color.

In some examples, the selected size and/or selected color may be a suggested size and/or a suggested color. For instance, computing system 200 may display a graphical user interface indicating the selected size and/or selected color to user 104 (e.g., via display screen 212). The user may provide user input to accept or modify the selected size and/or selected color. After the user has approved the size and/or color selections, computing system 200 may output, to a remote device, the indication of the selected size and/or an indication of the selected color of the component.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

capturing, via one or more sensors of a computing system, a representation of an ear of a user, wherein capturing the representation includes:

outputting, for display at a display device, live image data captured by an image sensor of the one or more sensors of the computing system;

outputting, by the computing system and for display at the display device, one or more graphical guides configured to assist the user in facilitating the capture of the representation of the ear of the user, wherein the one or more graphical guides are output for display on the live image data; and capturing, while the live image data and the graphical guides are being displayed by the display device, the representation of the ear of the user via at least the image sensor;

determining, based on the representation, a value of a measurement of the ear of the user; and selecting, based on the value of the measurement, a length of a wire or tube of a hearing instrument to be worn on the ear of the user.

2. The method of claim 1, wherein the representation of the ear comprises an image of the ear of the user.

3. The method of claim 2, wherein the representation of the ear comprises multiple images of the ear of the user.

4. The method of claim 3, wherein the multiple images each have different capture characteristics.

5. The method of claim 1, wherein the measurement is a distance between a superior auricular root of the ear and a top of a canal of the ear.

6. The method of claim 1, further comprising:

determining, based on the representation of the ear, a skin tone of a skin of the user; and selecting, based on the determined skin tone of the skin of the user, a color of the the wire or tube of the hearing instrument.

7. The method of claim 6, wherein selecting the color of the wire or tube of the hearing instrument comprises selecting the color of the wire or tube of the hearing instrument from a pre-determined set of colors.

8. The method of claim 6, further comprising:

outputting, by the computing system and to a remote server device, an indication of the selected color of the wire or tube of the hearing instrument.

9. The method of claim 1, further comprising:

outputting, by the computing system and to a remote server device, an indication of the selected length of the wire or tube of the hearing instrument.

10. The method of claim 1, wherein the one or more graphical guides include one or more of:

a graphical representation of the ear;

anatomy markers; and a graphical representation of the hearing instrument.

11. The method of claim 1, wherein the display device is included in the same device as the one or more sensors.

12. The method of claim 1, wherein the display device is included a different device than the one or more sensors.

13. The method of claim 1, wherein the one or more sensors comprise one or more of:

one or more depth sensors;

one or more structured light sensors; and one or more time of flight sensors.

14. A computing system comprising;

one or more sensors; and one or more processors that are implemented in circuitry and configured to:

capture, via the one or more sensors, a representation of an ear of a user, wherein to capture the representation of the ear, the one or more processors are configured to:

output, for display at a display device, live image data captured by an image sensor of the one or more sensors of the computing system;

output, for display at the display device, one or more graphical guides configured to assist the user in facilitating the capture of the representation of the ear of the user, wherein the one or more graphical guides are output for display on the live image data; and capture, while the live image data and the graphical guides are being displayed by the display device, the representation of the ear of the user via at least the image sensor;

determine, based on the representation, a value of a measurement of the ear of the user; and select, based on the value of the measurement, a length of a wire or tube of a hearing instrument to be worn on the ear of the user.

15. The computing system of claim 14, wherein the representation of the ear comprises an image of the ear of the user, and wherein the measurement is a distance between a superior auricular root of the ear and a top of a canal of the ear.

16. The computing system of claim 14, wherein the one or more processors are further configured to:

determine, based on the representation of the ear, a skin tone of a skin of the user; and select, based on the determined skin tone of the skin of the user, a color of the wire or tube of the hearing instrument.

17. The computing system of claim 14, wherein the one or more graphical guides include one or more of:

a graphical representation of the ear;

anatomy markers; and a graphical representation of the hearing instrument.

18. A non-transitory computer-readable storage medium storing instructions that, when executed, cause one or more processors of a computing system to:

capture, via one or more sensors of the computing system, a representation of an ear of a user, wherein to capture the representation, the instructions cause the one or more processors to:

output, for display at a display device, live image data captured by an image sensor of the one or more sensors of the computing system;

output, for display at the display device, one or more graphical guides configured to assist the user in facilitating the capture of the representation of the ear of the user, wherein the one or more graphical guides are output for display on the live image data; and capture, while the live image data and the graphical guides are being displayed by the display device, the representation of the ear of the user via at least the image sensor;

determine, based on the representation, a value of a measurement of the ear of the user; and select, based on the value of the measurement, a length of a wire or tube of a hearing instrument to be worn on the ear of the user.

* * * * *